United States Patent [19]

Hellwig

[11] 4,314,486
[45] Feb. 9, 1982

[54] VIBRATION DAMPENING RING

[76] Inventor: Lowell L. Hellwig, Rte. 4, Box 326, Excelsior Springs, Mo. 64024

[21] Appl. No.: 139,736

[22] Filed: Apr. 11, 1980

[51] Int. Cl.³ .............................................. F16F 15/16
[52] U.S. Cl. ...................................... 74/574; 74/573 F
[58] Field of Search ............................... 74/573 F, 574

[56] References Cited

U.S. PATENT DOCUMENTS 3,234,817  2/1966  Williamson ........................... 74/574

FOREIGN PATENT DOCUMENTS 609585   2/1935  Fed. Rep. of Germany ........ 74/574
1303813  1/1973  United Kingdom ................... 74/574

Primary Examiner—Kenneth Dorner
Attorney, Agent, or Firm—Harvey B. Jacobson

[57] ABSTRACT

A ring including an annular mounting flange portion and an annular main body portion formed integrally with and spaced axially from the mounting flange portion is provided. The mounting flange portion includes structure for its rigid mounting on and support from an outer peripheral portion of a high speed rotating component and the main body portion includes a cylindrical seat surface having a groove formed therein and extending continuously peripherally thereabout and opening laterally outwardly through the seat surface. A closure ring defining a cylindrical closure surface is supported from the body portion with the closure surface abutting and sealingly secured to the seating surface on opposite sides of the grooves whereby to close the latter. The closed groove has movement dampening liquid disposed therein and fluent weight bodies are also disposed within the groove and their movement within the groove is dampened by the movement dampening liquid.

8 Claims, 3 Drawing Figures

VIBRATION DAMPENING RING

BACKGROUND OF THE INVENTION

High speed rotating components such as the rotary compressor spool assemblies of jet engines are manufactured to close static and dynamic balance tolerances, but are subject to vibrations which may travel along the jet engine from the turbine section or otherwise be transferred to the compressor spool hub. Accordingly, a need exists for structure operative to dampen these vibrations.

Although various forms of vibration dampening structures including some of the general structural and operational features of the instant invention have been heretofore provided, such as those disclosed in U.S. Pat. Nos. 2,403,478, 2,636,399, 3,187,604, 3,425,239, 3,730,457 and 3,986,411, these vibrations dampening structures are not well suited for use on high speed rotating jet engine compressor spool assemblies.

BRIEF DESCRIPTION OF THE INVENTION

The dampening ring of the instant invention comprises a one-piece ring equipped with a main body portion and a mounting ring portion for anchoring the body portion relative to a compressor spool assembly. The main body portion includes a cylindrical seat surface and a peripherally continuous groove opening laterally outwardly through the seat surface. A closure ring including a cylindrical surface is provided and is secured over the cylindrical seat surface and is continuously sealed relative thereto along opposite sides of the groove. In this manner, the closure ring functions to close the groove and the main body portion is provided with a fill port and closure plug therefor by which a quantity of movement dampening liquid, such as oil and droplets of mercury, may be admitted into the groove formed within the body portion. The main object of this invention is to provide a vibration dampening ring which may be utilized to dampen vibrations transferred to a compressor spool assembly from a remote location.

Another object of this invention is to provide a vibration dampening ring specifically constructed in a manner enabling it to be mounted on an associated compressor spool assembly subsequent to the assembly being dynamically balanced.

Still another important object of this invention is to provide a vibration dampening ring construction which may be readily adapted for use in conjunction with different compressor spool assemblies.

A final object of this invention to be specifically enumerated herein is to provide a vibration dampening ring in accordance with the preceding objects and which will conform to conventional forms of manufacture, be of simple construction and easy to install, so as to provide a device that will be economically feasible, long lasting and relatively trouble-free in installation.

These together with other objects and advantages which will become subsequently apparent residue in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
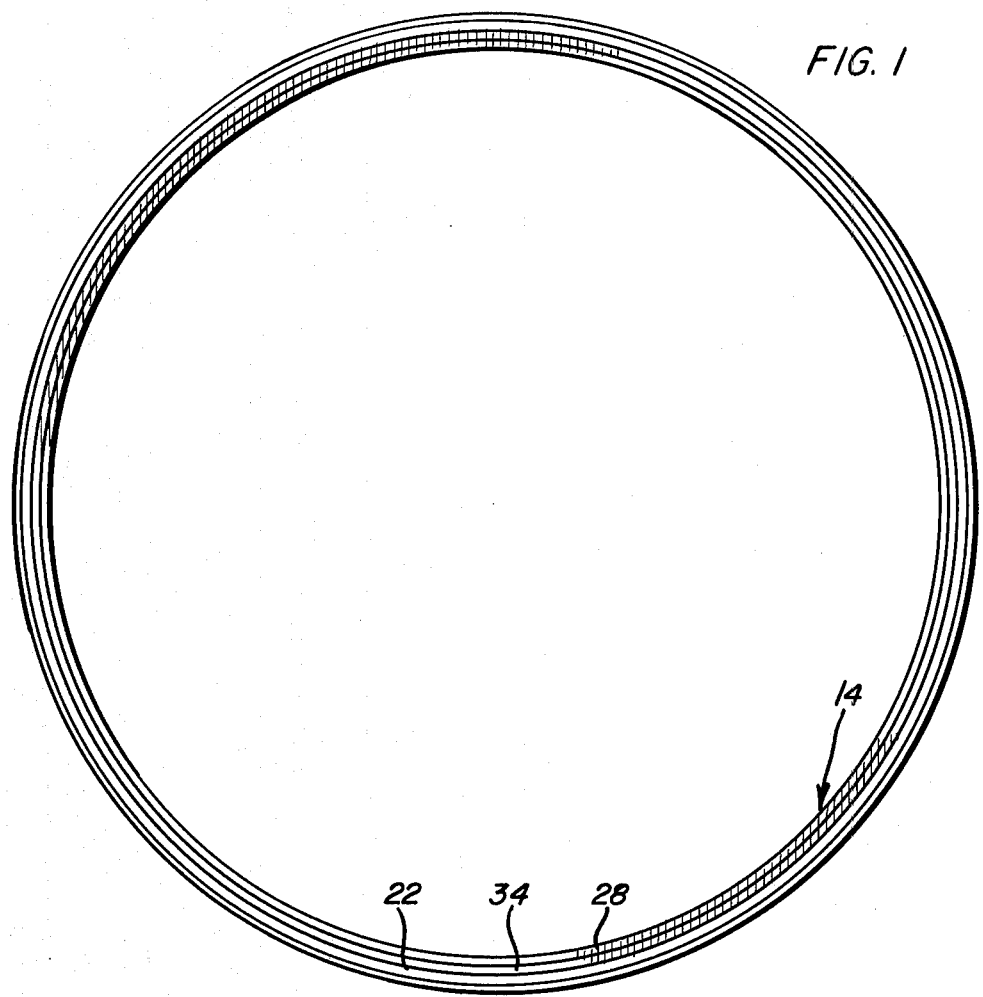
FIG. 1 is an elevational view of the dampening ring as seen from one end thereof.

Referring now more specifically to the drawings, the numeral 10 designates a peripheral flange portion of a conventional jet engine compressor spool assembly 12 and the reference numeral 14 generally designates the vibration dampening ring of the instant invention.

The ring 14 includes an annular mounting flange portion 16 defining an inner cylindrical seating surface 18 and equipped with peripherally spaced rivet receiving apertures 20. The mounting flange portion 16 is telescoped over and riveted to the outer surface of the peripheral flange portion 10 through the utilization of rivets (not shown) secured through the peripheral flange portion 10 and the apertures 20. The ring 14 additionally includes an annular main body portion 22 axially spaced from and formed integrally with the mounting flange portion 16 and the main body portion 22 includes an inner cylindrical seating surface 24. The main body portion 22 has a continuous peripheral groove 26 formed therein which opens outwardly through the seating surface 22 intermediate its axial ends.

Figure 3:
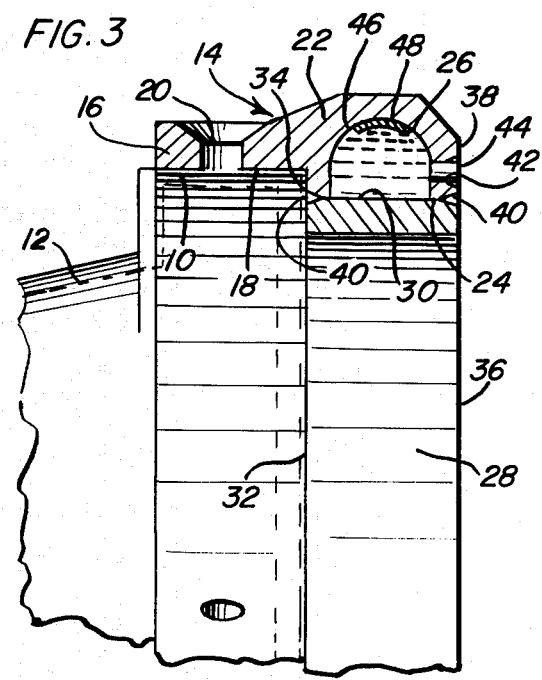
FIG. 3 is a sectional view taken substantially upon the plane indicated by the section 3—3 of FIG. 2.
Figure 2:
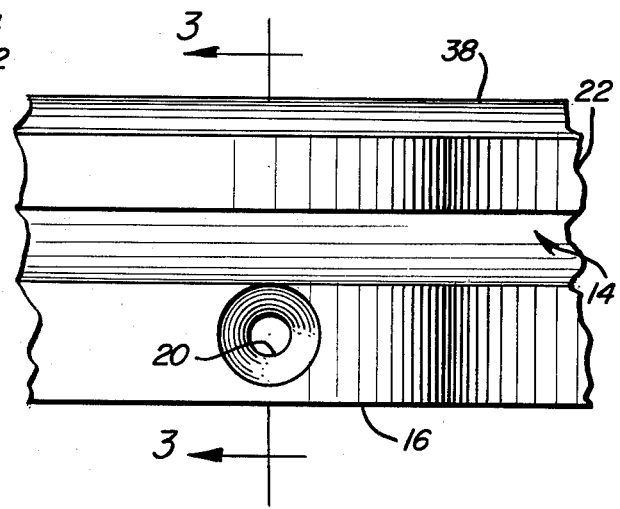
FIG. 2 is a fragmentary side elevational view of the dampening ring.

A closure ring 28 is provided and includes an outer cylindrical closure surface 30 and the ring 28 is assembled relative to the main body portion 22 by cooling and thus shrinking the ring 28 and subsequently placing the ring 28 in position, as illustrated in FIG. 3, the fit of the ring 28 within the main body portion 22 comprising a 0.02 inch press fit. The axial end 32 of the closure ring 28 is flush with the radial shoulder 34 of the main body portion 22 and the axial end 36 projects slightly outwardly of the axial face 38 of the main body portion 22 and is ground flush with the axial face 38 after installation of the vibration dampening ring 14 on the peripheral flange portion 10.

The opposite ends of the closure ring 28 are welded relative to the corresponding ends of the main body portion 22 by electron beam welding 40, the main body portion 22 and closure ring 28 being constructed of stainless steel.

The main body portion 22 includes a smooth filler bore 42 and a plug 44 is provided for the bore 42.

The groove 26 is filled with oil 46 and droplets 48 of mercury through the filler bore 42 and the latter is subsequently closed by the plug 44. The plug 44 is welded in position within the bore 42.

The vibration dampening ring 14 is mounted on the peripheral flange portion 10 of the compressor spool assembly 12 only after the assembly 12 has been dynamically balanced. Of course, the droplets 48 of mercury tend to automatically dynamically balance the ring 14 and the oil 46 tends to dampen movement of the drops of droplets 48 of mercury.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vibration dampening ring for mounting concentrically on an outer peripheral portion of a high speed rotating component, said ring including an annular mounting flange portion and an annular main body portion formed integrally with and spaced axially relative to said mounting flange portion, said mounting flange portion including means adapted for rigid mounting on and support from said outer peripheral portion, said main body portion including a cylindrical seating surface and having an elongated groove formed in and extending peripherally thereabout, said groove opening laterally outwardly through said cylindrical seat surface intermediate the opposite axial ends thereof, and a closure ring defining a cylindrical closure surface supported from said body portion with said closure surface abutting and sealingly secured to said seating surface on opposite sides of said groove closing the latter, said closed groove having movement dampening liquid disposed therein and fluent weight material of a greater specific gravity than said liquid also disposed in said groove.

2. The combination of claim 1 wherein said seat surface faces radially inwardly and said closure surface faces radially outwardly.

3. The combination of claim 1 wherein said main body portion includes a filler bore formed therein including inner and outer ends, said main body portion including an axial end face at the axial end thereof remote from said mounting flange portion, said inner end opening into said groove and said outer end opening outwardly of the axial end face of said main body portion remote from said mounting flange portion, and a closure plug sealingly secured in said bore.

4. The combination of claim 1 wherein said seat surface faces radially inwardly and said closure surface faces radially outwardly, said ring outer closure surface being a press fit within said seat surface.

5. The combination of claim 4 wherein said ring comprises a cylindrical member of constant radial wall thickness.

6. The combination of claim 4 wherein said mounting flange portion comprises a cylindrical flange portion forming an axial continuation of one end of said annular main body portion.

7. The combination of claim 6 wherein said liquid comprises oil and said fluent weight material comprises droplets of mercury.

8. A vibration dampening ring for mounting concentrically on an outer peripheral portion of a high speed rotating component, said ring including an annular mounting flange portion and an annular main body portion formed integrally with and spaced axially relative to said mounting flange portion, said mounting flange portion including means adapted for rigid mounting on and support from said outer peripheral portion, said main body portion including an annular seating surface facing at least substantially radially of said main body portion and having an elongated groove formed in and extending peripherally thereabout, said groove opening laterally outwardly through said seating surface intermediate the opposite axial ends thereof, and a closure ring defining an annular closure surface facing at least substantially radially of said closure ring and supported from said body portion with said closure surface abutting and sealingly secured relative to said seating surface on opposite sides of said groove closing the latter, said closed groove having movement dampening liquid disposed therein and fluent weight material of a greater specific gravity than said liquid also disposed in said groove.

* * * * *